(12) United States Patent
Norimine et al.

(10) Patent No.: US 11,563,254 B2
(45) Date of Patent: Jan. 24, 2023

(54) BATTERY MODULE AND BATTERY PACK (71) Applicant: Panasonic Intellectual Property Management Co., Ltd., Osaka (JP)

(72) Inventors: Shota Norimine, Osaka (JP); Mitsutoshi Tajima, Hyogo (JP); Hirotaka Ogino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 218 days.

(21) Appl. No.: 16/979,954

(22) PCT Filed: Feb. 28, 2019

(86) PCT No.: PCT/JP2019/007740
§ 371 (c)(1),
(2) Date: Sep. 11, 2020

(87) PCT Pub. No.: WO2019/181411
PCT Pub. Date: Sep. 26, 2019

(65) Prior Publication Data
US 2021/0005856 A1 Jan. 7, 2021

(30) Foreign Application Priority Data
Mar. 20, 2018 (JP) .............................. JP2018-053412

(51) Int. Cl.
*H01M 50/264* (2021.01)
*H01M 50/20* (2021.01)
(Continued)

(52) U.S. Cl.
CPC ......... *H01M 50/264* (2021.01); *H01M 50/20* (2021.01); *H01M 50/209* (2021.01);
(Continued)

(58) Field of Classification Search
None
See application file for complete search history.

(56) References Cited

U.S. PATENT DOCUMENTS

| 7,507,499 B2 * | 3/2009 | Zhou | H01M 50/20 429/96 |
| 2014/0045026 A1 * | 2/2014 | Fritz | H01M 50/20 429/99 |

(Continued)

FOREIGN PATENT DOCUMENTS

| CN | 107732063 A | 2/2018 |
| JP | 2012-181970 | 9/2012 |

(Continued)

OTHER PUBLICATIONS

International Search Report of PCT application No. PCT/JP2019/007740 dated Apr. 16, 2019.

(Continued)

*Primary Examiner* — Gregg Cantelmo
(74) *Attorney, Agent, or Firm* — McDermott Will & Emery LLP (57) ABSTRACT

A battery module includes: a battery stack having a plurality of batteries; a plurality of first restraining members and a plurality of second restraining members; and connecting members. The first restraining members and the second restraining members define a housing space for the battery stack. Each of the first restraining members has a first housing part extending in a direction intersecting a planar direction in which the battery stack, the first restraining members, and the second restraining members are arranged, and each of the second restraining members has a second housing part extending in the planar direction. Each of the connecting members connects each of the first restraining members and each of the second restraining members to each other by being housed in the first housing part of each (Continued)

of the first restraining members and in the second housing part of each of the second restraining members.

5 Claims, 5 Drawing Sheets

(51) Int. Cl.
  *H01M 50/293* (2021.01)
  *H01M 50/209* (2021.01)
  *H01M 50/291* (2021.01)
  *H01M 50/258* (2021.01)
(52) U.S. Cl.
  CPC ....... *H01M 50/258* (2021.01); *H01M 50/291* (2021.01); *H01M 50/293* (2021.01)

(56) References Cited

U.S. PATENT DOCUMENTS

2015/0064539 A1* 3/2015 Kim .................... H01M 50/291
                                                              429/149
2019/0013500 A1* 1/2019 Sakurai ............. H01M 10/0481

FOREIGN PATENT DOCUMENTS

| JP | 2013122819 A | * | 6/2013 | |
| WO | WO-2014024432 A1 | * | 2/2014 | ............... B60K 1/04 |

OTHER PUBLICATIONS

English Translation of Chinese Office Action dated Jul. 5, 2022 for the related Chinese Patent Application No. 201980019483.0.

* cited by examiner

BATTERY MODULE AND BATTERY PACK

CROSS-REFERENCE TO RELATED APPLICATIONS

This application is a U.S. national stage application of the PCT International Application No. PCT/JP2019/007740 filed on Feb. 28, 2019, which claims the benefit of foreign priority of Japanese patent application 2018-053412 filed on Mar. 20, 2018, the contents all of which are incorporated herein by reference.

TECHNICAL FIELD

The present invention relates to a battery module and a battery pack.

BACKGROUND ART

As a power source for, for example, a vehicle and the like that require a high output voltage, there is known a battery stack configured with a plurality of series-connected batteries (for example, see PTL 1). In general, a battery stack has a module structure in which a predetermined number of batteries are stacked and are fastened with binding bars. Further, a plurality of the battery stacks are housed in a chassis (=housing) for a battery pack.

CITATION LIST

Patent Literature

PTL 1: Unexamined Japanese Patent Publication No. 2012-181970

SUMMARY OF THE INVENTION

In the conventional battery module, battery stacks are sandwiched by a pair of end plate. Further, both end parts of each binding bar are bent, and their tip ends are fixed to the end plates. With this arrangement, the batteries in a stacking direction of the batteries are fastened.

Regarding the battery, a gas is generated inside due to repetition of charging and discharging or other causes, and an outer jacket swells. In addition, electrode bodies themselves swell, thereby causing the outer jacket (=case) to swell. When the batteries swell, a load is put on bent parts of the binding bars. Particularly in recent years, the capacity of the battery has been increased, and an amount of swelling of the battery tends to increase. Therefore, the load put on the bent part of the binding bar tends to increase.

To address the above issue, it is considered that a thickness of the binding bar is made thicker to increase strength of the bent part, thereby addressing the increasing load. However, if the binding bar is made thicker, it is difficult to bend the binding bar. Alternatively, it is considered that a bending radius of the bent part is made small to reduce concentration of stress on the bent part, thereby addressing the increasing load. However, when the bending radius is made small, the binding bar is preferably made thinner. However, when the binding bar is made thinner, the overall strength of the binding bar decreases. Therefore, the conventional binding bar having the conventional bending structure may be incapable of sufficiently suppressing the swelling of the battery in the future.

The present invention has been made in view of such a situation, and an object of the present invention is to provide a technique for more surely suppress the swelling of batteries in a battery module.

An aspect of the present invention is directed to a battery module. The battery module includes: a battery stack including a plurality of batteries, the batteries being stacked; a plurality of first restraining members and a plurality of second restraining members that restrain the battery stack; and connecting members each of which connects one of the first restraining members and one of the second restraining members to each other. Each of the first restraining members extends in a stacking direction of the batteries, and the plurality of first restraining members are arranged in a direction intersecting the stacking direction. Each of the second restraining members extends in a direction intersecting the stacking direction, and the plurality of second restraining members are arranged in the stacking direction. Neighboring two of the first restraining members and neighboring two of the second restraining members define a housing space where the battery stack is housed. Each of the first restraining members has a first housing part extending in a direction intersecting a planar direction in which the battery stack, the plurality of first restraining members, and the plurality of second restraining members are arranged, and each of the second restraining members has a second housing part extending in the planar direction. Each of the connecting members connects the one of the first restraining members and the one of the second restraining members to each other by being housed in the first housing part of the one of the first restraining members and in the second housing part of the one of the second restraining members.

Another aspect of the present invention is directed to a battery pack. The battery pack includes: the battery module of the above aspect; and a chassis that houses the battery module.

According to the present invention, the swelling of batteries in a battery module can be surely suppressed.

DESCRIPTION OF EMBODIMENT

In the following, the present invention will be described based on a preferred exemplary embodiment with reference to the drawings. The exemplary embodiment does not limit the present invention but is an example. Not all features described in the exemplary embodiment and combinations of the features are necessarily essential to the present invention. The same reference marks are assigned to the same or equivalent components, members, and processes shown in the drawings, and a redundant description will be omitted. Further, scales and shapes of the parts shown in the drawings are determined for the sake of easy description, and the scales or shapes should not be interpreted as limitation unless otherwise mentioned. Further, in some cases, even the same members are shown on slightly different scales between different drawings. Further, the terms "first", "second", and the like, when used in the present description and the claims, do not mean any order or degree of importance unless otherwise mentioned, but are intended to distinguish one component from the others.

Figure 1:
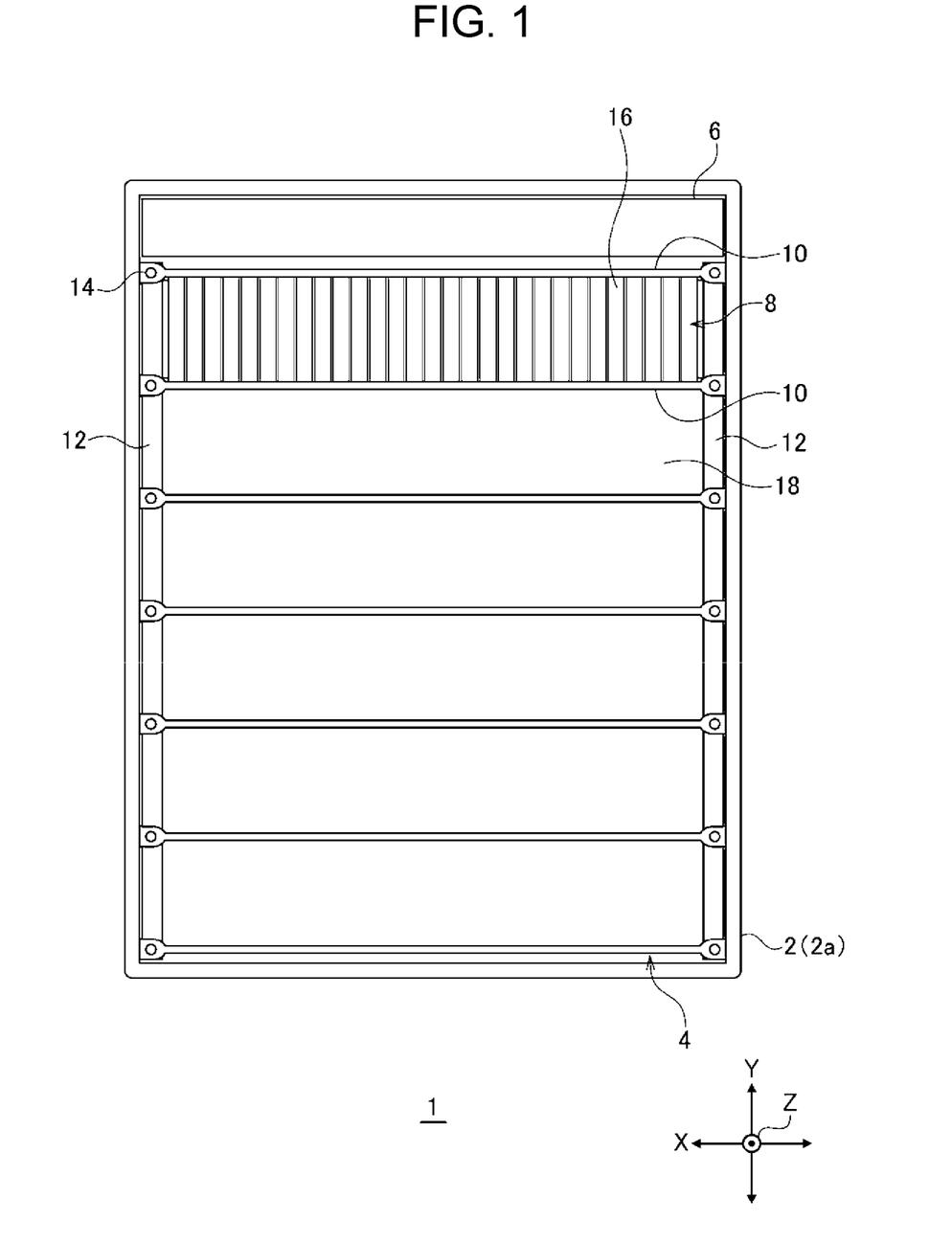
FIG. 1 is a plan view showing a schematic structure of a battery pack according to an exemplary embodiment.
Figure 2:
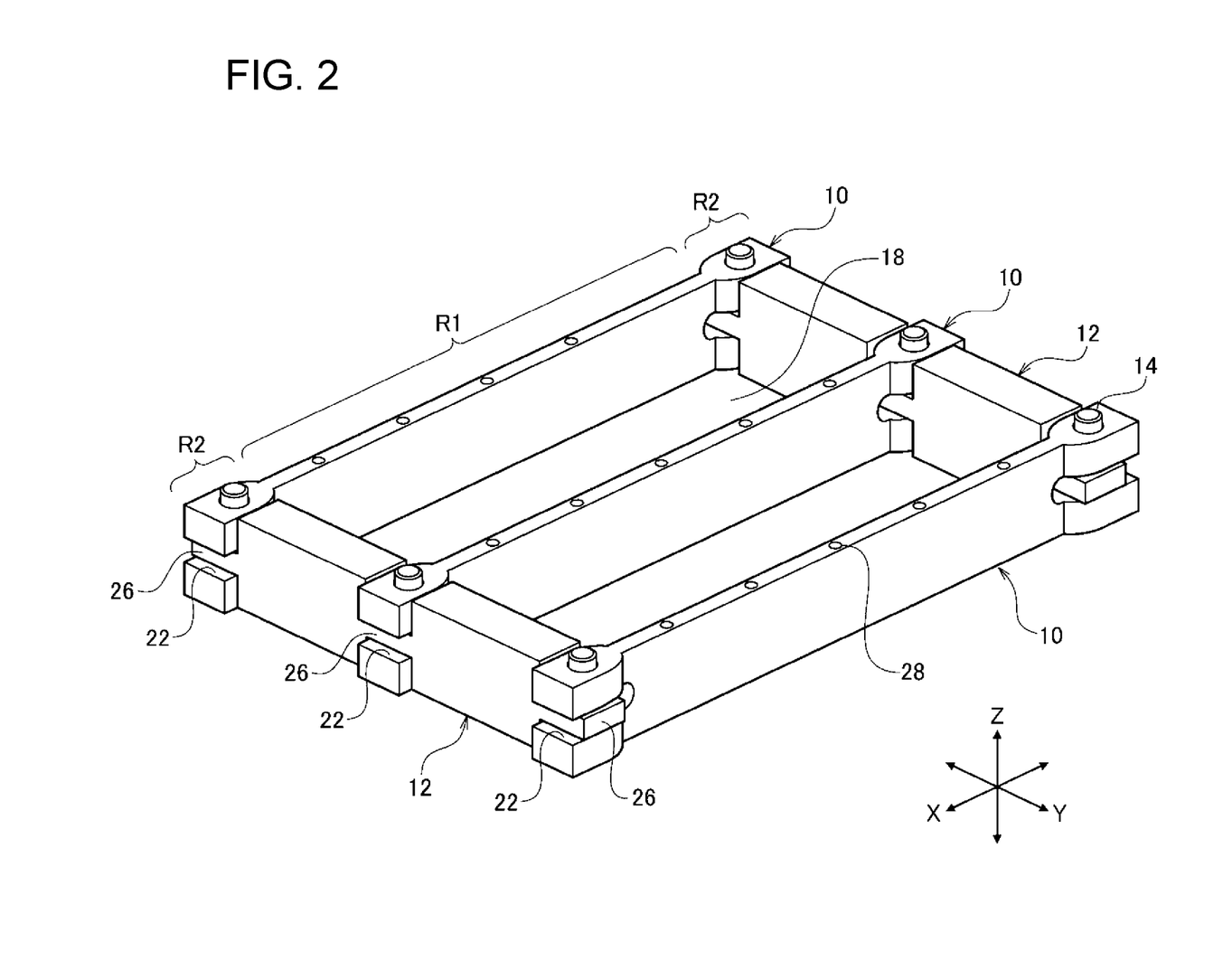
FIG. 2 is a perspective view of a restraining structure for a battery stack in a battery module according to the exemplary embodiment.
Figure 3:
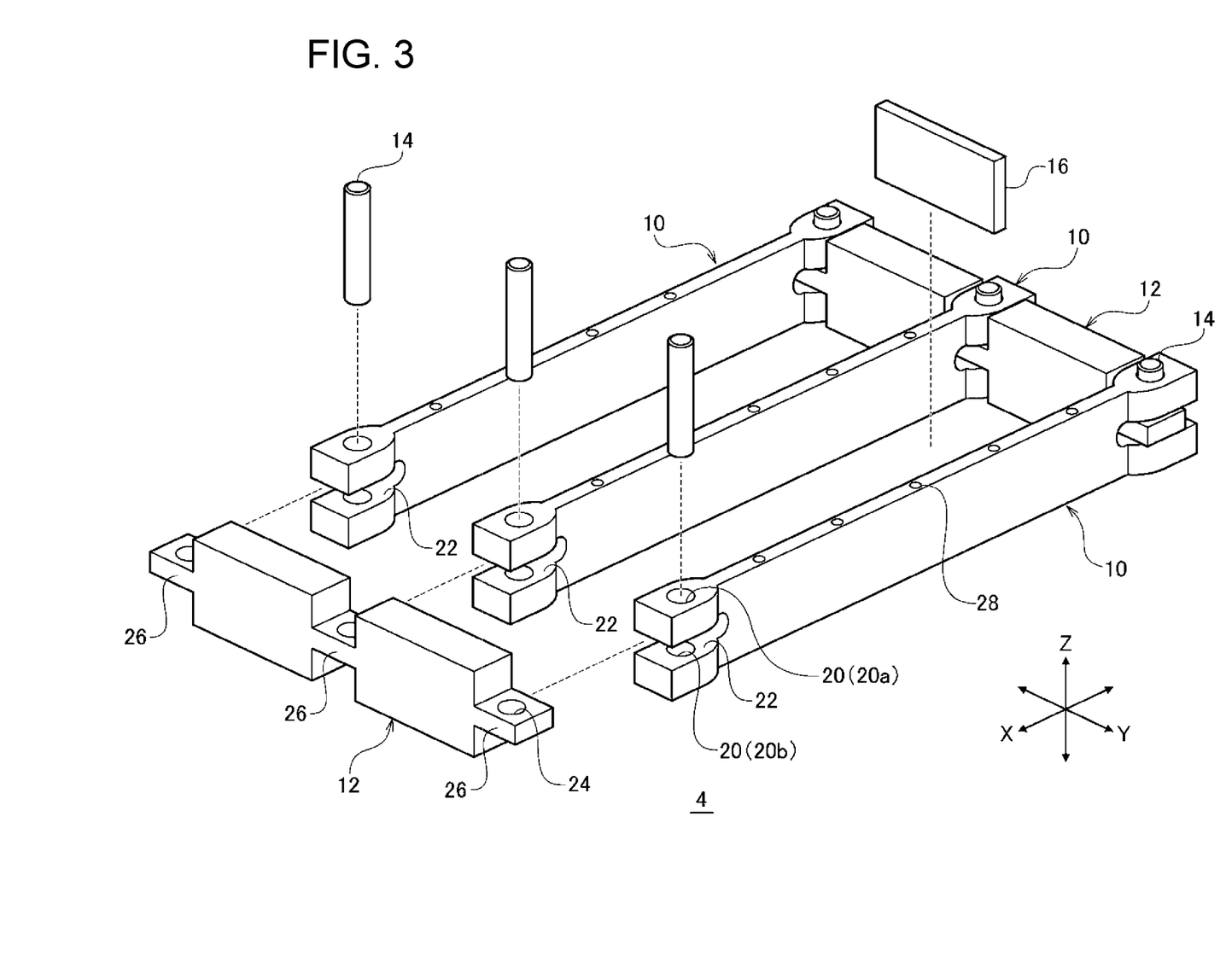
FIG. 3 is an exploded perspective view of the restraining structure of the battery stack

FIG. 1 is a plan view showing a schematic structure of a battery pack according to the exemplary embodiment. FIG. 2 is a perspective view of a restraining structure for a battery stack in a battery module according to the exemplary embodiment. FIG. 3 is an exploded perspective view of the restraining structure for the battery stack. Note that FIG. 1 shows a chassis but does not show a lid of the chassis. Further, only one battery stack 8 is shown. FIGS. 2 and 3 each show only a part of the restraining structure.

Battery pack 1 includes as main components: chassis (=housing) 2; battery module 4; and electric system unit 6. Chassis 2 is a container that houses battery module 4 and electric system unit 6. Chassis 2 is preferably waterproof. Chassis 2 includes container part 2a having an opening and a lid (not shown) that closes the opening of container part 2a. Chassis 2 is fixed to a mounting object (not shown) such as a vehicle body. Electric system unit 6 includes: wiring connected to battery module 4; and conventionally publicly known mechanism or device such as a voltage detection device.

Battery module 4 includes as main components: battery stack 8; a plurality of first restraining members 10; a plurality of second restraining members 12; and connecting members 14.

Battery stack 8 has a plurality of stacked batteries 16. Each battery 16 is a rechargeable secondary battery such as a lithium ion battery, a nickel-metal-hydride battery, or a nickel-cadmium battery. Battery 16 is a so-called prismatic (=rectangular) battery, and has an outer jacket (=case) having a flattened rectangular parallelepiped shape. The outer jacket houses electrode bodies and an electrolyte solution. Battery 16 has an output terminal (not shown) of positive electrodes provided near one end in a longitudinal direction and an output terminal (not shown) of negative electrodes provided near the other end. Between the pair of output terminals, there is provided a valve (not shown). The valve is configured to open when an internal pressure of the outer jacket rises to a predetermined value or higher so that the gas inside the outer jacket can be released.

In the present exemplary embodiment, the side on which the output terminals are provided is a top surface of battery 16, and the opposite side is a bottom surface of battery 16. Further, battery 16 has two main surfaces connecting between the top surface and the bottom surface. These main surfaces have the largest area of the six surfaces of battery 16. The two surfaces other than the top surface, the bottom surface, and the two main surfaces are side surfaces of battery 16. Further, a top surface side of batteries 16 is a top surface of battery stack 8, and a bottom surface side of batteries 16 is a bottom surface of battery stack 8. For the sake of convenience, the top surface side of battery stack 8 is upward direction in a vertical direction, and the bottom surface side of battery stack 8 is downward direction in the vertical direction.

The plurality of batteries 16 are stacked such that the main surfaces of neighboring batteries 16 are opposed to each other. Note that the term "stack" means to arrange a plurality of members in any one direction. Therefore, stacking of batteries 16 includes horizontally arranging a plurality of batteries 16. Further, batteries 16 are disposed such that the output terminals are directed in the same direction (in this exemplary embodiment, the upward direction in the vertical direction). Neighboring two batteries 16 are stacked such that a positive terminal of one battery and a negative terminal of the other battery are adjacent to each other. The positive terminal and the negative terminal are electrically connected via a bus bar (not shown). However, in one case, bus bars can be used to parallel connect the same polarity output terminals of the neighboring two batteries 16. When neighboring batteries 16 are parallel connected, three or more batteries 16 are sometimes parallel connected.

Separators (not shown) are disposed between neighboring batteries 16. Specifically, the plurality of batteries 16 and the plurality of separators are stacked alternately. The separators are made of an insulating resin, for example. Therefore, the outer jackets of neighboring two batteries 16 are electrically insulated by the separator. Although FIG. 1 shows battery stack 8 constituted by 29 stacked batteries 16, the number of batteries 16 is not particularly limited. Note that a separator is disposed between each of batteries 16 and each of first restraining members 10 and between each of batteries 16 and each of second restraining members 12. This arrangement allows insulating between batteries 16 and first restraining members 10 and between batteries 16 and second restraining members 12. The outer jackets of batteries 16 may be covered with insulating sheets such as shrink tubes. This arrangement allows reducing short-circuiting between neighboring batteries 16, between batteries 16 and first restraining members 10, and between batteries 16 and second restraining members 12.

Battery stack 8 is restrained by the plurality of first restraining members 10, the plurality of second restraining members 12, and connecting members 14. That is, first restraining members 10, second restraining members 12, and connecting members 14 constitute a restraining structure of battery stack 8. These members are made of metal such as iron, aluminum, or stainless-steel.

First restraining members 10 are each a long object having a flat plate shape and extend in stacking direction X of the batteries. First restraining member 10 corresponds to a binding bar. First restraining member 10 has no bent part. The plurality of first restraining members 10 are arranged in a direction intersecting stacking direction X, that is, arranged in horizontal direction Y intersecting stacking direction X in the present exemplary embodiment. Second restraining members 12 are each a long object having a flat plate shape and extend in a direction intersecting stacking direction X, that is, extend in horizontal direction Y in the present exemplary embodiment. Second restraining member 12 corresponds to an end plate. The plurality of second restraining members 12 are arranged in stacking direction X.

Neighboring two first restraining members 10 and neighboring two second restraining members 12 define housing space 18 where battery stack 8 is housed. Two first restraining members 10 extending in stacking direction X sandwich battery stack 8 in horizontal direction Y. Two second restraining members 12 extending in horizontal direction Y sandwich battery stack 8 in stacking direction X. Further, connecting members 14 are attached at intersection points between first restraining members 10 and second restraining members 12. Thus, first restraining members 10 and second restraining members 12 are connected to each other.

First restraining member 10 has first housing parts 20 each extending in a direction intersecting a planar direction in which battery stacks 8, the plurality of first restraining members 10, and the plurality of second restraining members 12 are arranged, in other words, extending in a direction intersecting an extending direction of an XY plane. First housing part 20 of the present exemplary embodiment is constituted by a through-hole extending in vertical direction Z intersecting the XY plane. First restraining member 10 has first housing part 20 on each of the both end parts. Further, first restraining member 10 has cutout 22 at a central part, in vertical direction Z, of each region R2 where first housing part 20 is provided. First housing part 20 is divided by cutout 22 into upper side hole 20a and lower side hole 20b. In vertical direction Z, upper side hole 20a and lower side hole 20b are respectively located in the upward direction and downward direction.

Second restraining member 12 has second housing parts 24 each extending in a direction intersecting the XY planar direction and overlapping first housing part 20. Second housing part 24 of the present exemplary embodiment is constituted by a through-hole extending in vertical direction Z. In second restraining member 12, there are provided the plurality of second housing parts 24 with predetermined intervals in the extending direction (that is, horizontal direction Y). A gap between neighboring second housing parts 24 is determined depending on a distance from one side surface of battery 16 to the other side surface. Further, regarding second restraining member 12, a dimension, in vertical direction Z, of each region where second housing part 24 is provided is smaller than the other region. That is, second restraining member 12 has narrow-width parts 26 with predetermined intervals in the extending direction. Further, second housing part 24 is provided in each narrow-width part 26.

A dimension of each cutout 22 in vertical direction Z and a dimension of each narrow-width part 26 in vertical direction Z are almost identical. First restraining member 10 and second restraining member 12 are engaged with each other with narrow-width part 26 fit in cutout 22. In other words, first restraining member 10 and second restraining member 12 are joined by a box joint between cutout 22 constituting a recess and narrow-width part 26 constituting a projection. In this state, first housing part 20 and second housing part 24 are overlapping each other as viewed in vertical direction Z. Connecting member 14 is a rod-shaped member and is housed in first housing part 20 and second housing part 24. In other words, connecting member 14 is inserted into the through-hole constituting first housing part 20 and the through-hole constituting second housing part 24. Thus, first restraining member 10 and second restraining member 12 are connected to each other.

For example, a diameter of lower side hole 20b of first housing part 20 is slightly smaller than a diameter of connecting member 14. When being inserted into first housing part 20 and second housing part 24, connecting member 14 is press fit into lower side hole 20b. In this manner, first restraining member 10 and second restraining member 12 are connected, and, in addition, connecting member 14 is fixed.

In a state where battery stack 8 is housed in housing space 18, a pair of first restraining members 10 position battery stack 8 in horizontal direction Y. In addition, a pair of second restraining members 12 position battery stack 8 in stacking direction X. Further, the pair of first restraining members 10 and the pair of second restraining members 12 suppress an increase in a volume of battery stack 8 due to swelling of batteries 16.

When batteries 16 swell, battery stack 8 increases its dimension mainly in stacking direction X. This applies a force in a pulling direction to first restraining members 10. Further, regarding connecting members 14, relatively opposite direction forces are applied to a part located in first housing part 20 and a part located in second housing part 24. In this state, the restraining structure equipped on battery module 4 can suppress the swelling of batteries 16 by tensile strength of first restraining members 10 in stacking direction X and shear strength of connecting members 14, thereby maintaining the dimension of battery stack 8.

Battery module 4 of the present exemplary embodiment has a plurality of housing spaces 18 formed in such a manner that three or more first restraining members 10 are connected to a pair of second restraining members 12. More specifically, seven first restraining members 10 are connected to a pair of second restraining members 12. This arrangement forms six housing spaces 18. Therefore, battery module 4 has six battery stacks 8. Housing spaces 18 and battery stacks 8 are arranged in horizontal direction Y. However, the numbers of first restraining members 10, second restraining members 12, and housing spaces 18 are not particularly limited.

The restraining structure of the present exemplary embodiment can flexibly deal with a change in the number of battery stacks 8 to be mounted by adjusting the length of second restraining members 12 and the number of first restraining members 10 connected to the pair of second restraining members 12. In addition, by adjusting the length of first restraining members 10, it is possible to deal with a change in a stacking number of batteries 16.

Further, first restraining members 10 each have fixing parts 28 that are fixed to chassis 2. Fixing parts 28 of the present exemplary embodiment are each constituted by an insertion hole through which a fastening member such as a screw is inserted. Container part 2a and/or a lid of chassis 2 has through-holes (not shown) that overlap fixing parts 28 in a state where battery module 4 is housed in chassis 2. The fastening members are inserted into the through-holes provided in container part 2a and/or the lid and into fixing parts 28, so that chassis 2 and battery module 4 are fixed to each other. By fixing first restraining members 10 to chassis 2, rigidity of chassis 2 can be improved. That is, the restraining structure of battery stacks 8 functions as a framework structure to reinforce chassis 2.

Fixing parts 28 are provided in region R1, of first restraining member 10, adjacent to battery stack 8. Region R1 is a region except a region in contact with housing space 18 and except regions R2 in each of which first housing part 20 is provided. Therefore, even if first restraining members 10 become longer with an increase in the stacking number of batteries 16, it is possible to maintain the rigidity of chassis 2. In addition, by making first restraining members 10 longer, it is possible to increase the stacking number of batteries 16 without increasing the number of components. As a result, it is possible to minimize the weight of battery module 4.

Figure 4:
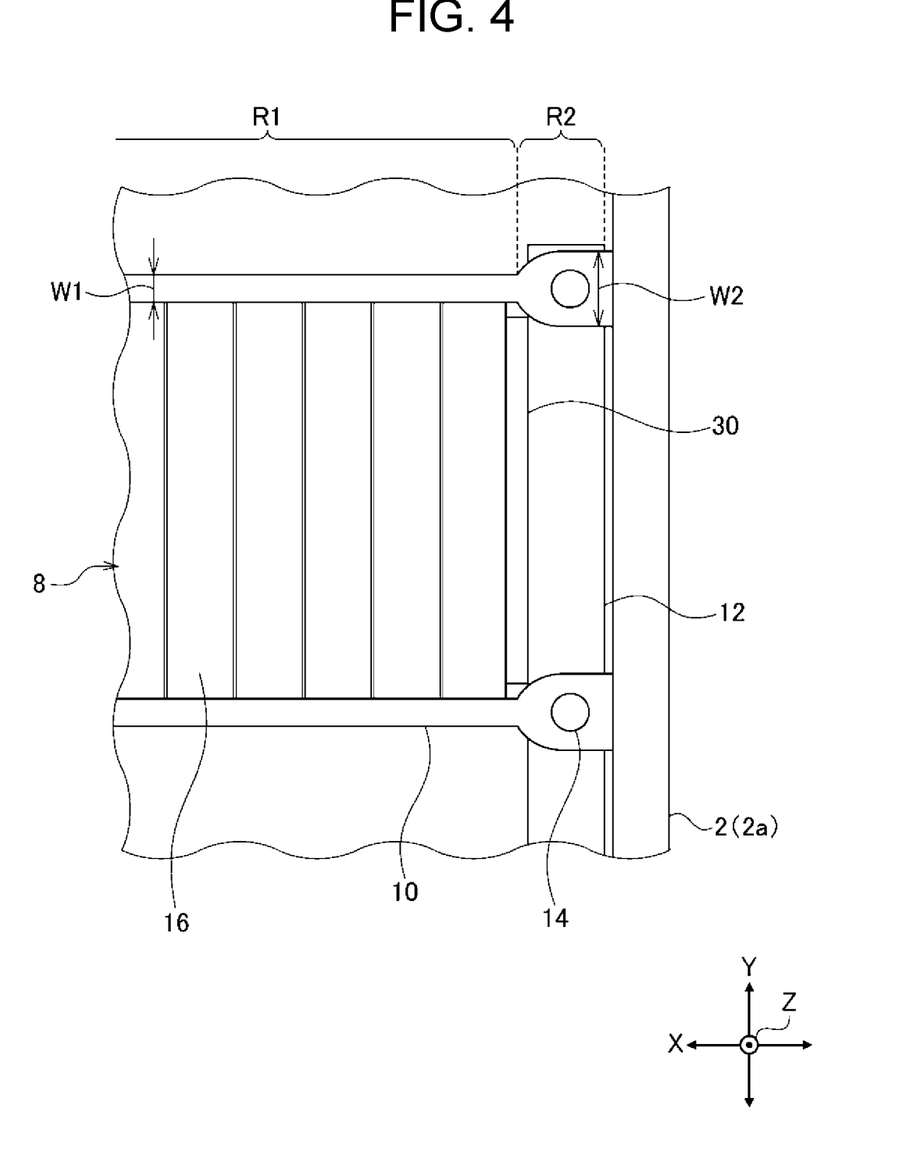
FIG. 4 is a partially enlarged plan view of the battery module.

Further, as shown in FIG. 4, battery module 4 includes a flat plate-shaped spacer 30 between second restraining member 12 and battery stack 8. FIG. 4 is a partially enlarged plan view of battery module 4. Spacer 30 is a gap adjusting member that is disposed between second restraining member 12 and battery stack 8 to fill a gap between second restraining member 12 and battery stack 8. There is sometimes created a gap between battery stack 8 and second restraining member 12 due to a dimensional tolerance of battery 16 or other causes. By disposing spacer 30 in this gap, battery stack 8 can be fixed more securely. Spacer 30 is made of metal or resin material. Spacer 30 preferably has flexibility. This arrangement enables also spacer 30 to absorb swelling of batteries 16.

Further, regarding first restraining member 10, width W1 of region R1 adjacent to battery stack 8 is narrower than width W2 of each region R2 where first housing part 20 is provided. Widths W1 and W2 are dimensions in horizontal direction Y. This arrangement enables housing space 18 to be larger as compared to the case where width W1 of region R1 and width W2 of region R2 are identical. As a result, the dimensions of batteries 16 can be larger, and a volume energy density of battery module 4 can therefore be increased. Further, it is also possible to increase the volume energy density by reducing the number of first restraining members 10 connected to the pair of second restraining members 12 to make each housing space 18 larger, so that larger batteries 16 are stacked.

Further, by increasing width W2 of each region R2 where first housing part 20 is provided, the diameter of connecting member 14 can be made larger. This arrangement allows increasing the strength of the restraining structure of battery stack 8.

As described above, battery module 4 according to the present exemplary embodiment includes: battery stack 8; a plurality of first restraining members 10 and a plurality of second restraining members 12 that restrain battery stack 8; and connecting members 14 that connect first restraining members 10 and second restraining members 12. Each first restraining member 10 extends in stacking direction X of batteries 16, and the plurality of first restraining members 10 are arranged in horizontal direction Y. Further, each second restraining member 12 extends in horizontal direction Y, and the plurality of second restraining members 12 are arranged in stacking direction X. Neighboring two first restraining members 10 and neighboring two second restraining members 12 define housing space 18 for battery stack 8.

Further, each first restraining member 10 has first housing parts 20 each extending in vertical direction Z intersecting the XY planar direction, and each second restraining member 12 has second housing parts 24 each extending in vertical direction Z. Further, connecting members 14 each connect each of first restraining members 10 and each of second restraining members 12 to each other by being housed in corresponding first housing part 20 and corresponding second housing part 24. Such a structure as described above can suppress an increase in the dimension of battery stack 8 due to swelling of batteries 16 by the tensile strength of first restraining members 10 and the shear strength of connecting members 14.

Therefore, it is possible to further increase the strength of the restraining structure for dealing with the swelling of batteries 16 compared with the structure in which binding bars each having bent parts on the tip ends are used to fasten battery stack 8. Therefore, it is possible to further surely suppress the swelling of batteries 16 in battery module 4. In addition, it is possible to deal with the swelling amount that is increasing with the increase in the capacity of battery 16. Further, by mounting battery module 4 described above on battery pack 1, it is possible to provide safer battery pack 1.

Further, with the present exemplary embodiment, it is possible to increase the strength of the restraining structure by adjusting one or more of the diameter of connecting member 14, the thickness of first restraining member 10, and the thickness of second restraining member 12. That is, it is possible to easily increase a reaction force against the swelling of batteries 16 without changing the dimension in vertical direction Z.

Further, in battery module 4, three or more first restraining members 10 are connected to the pair of second restraining members 12 to form the plurality of housing spaces 18. This arrangement allows fastening the plurality of housing spaces 18 with a smaller number of components. As a result, it is possible to minimize the weight of battery module 4. Further, it is possible to easily increase or reduce the number of battery stacks 8 to be housed. With the present exemplary embodiment, it is possible to easily deal with an increase in the size of battery stack 8 with an increase in the size or stacking number of batteries 16 by adjusting the numbers of first restraining members 10 and second restraining members 12 to be assembled or adjusting the dimensions of first restraining members 10 and second restraining members 12.

Note that in the present exemplary embodiment, the plurality of first restraining members 10 are connected to the pair of second restraining members 12; however, it is also possible to assemble three or more second restraining members 12 and three or more first restraining members 10 so that housing spaces 18 can be arranged in a matrix. Alternatively, a pair of first restraining members 10 and a pair of second restraining members 12 may be assembled to form only one housing space 18.

Further, first restraining members 10 have fixing parts 28 to be fixed to chassis 2. This arrangement allows increasing rigidity of battery pack 1. Therefore, it is possible to secure the rigidity of battery pack 1 while allowing battery stack 8 to be increased in size or allowing the number of mounted battery stacks 8 to increased. As a result, it is possible to improve the volume energy density of battery pack 1. The number of components of battery module 4 can be reduced, and when batteries 16 are increased in size, the volume energy density can be increased also because of this advantage.

Further, battery stacks 8 are each surrounded by first restraining members 10 and second restraining members 12. Therefore, first restraining members 10 and second restraining members 12 are used for heat dissipation of batteries 16. This arrangement allows reducing deterioration in performance of batteries 16 caused by temperature rise. In addition, the arrangement contributes to prevention of thermal runaway or catching fires of batteries 16. In addition, battery pack 1 can be downsized as compared with a case where a cooling structure for batteries 16 is separately provided.

The present invention is not limited to the above-mentioned exemplary embodiment, and modifications such as various design changes can be added based on knowledge of those skilled in the art. The modified exemplary embodiments are also included in the scope of the present invention. A new exemplary embodiment made by adding modifications to the above-mentioned exemplary embodiment also has respective effects of the combined exemplary embodiments and the modified exemplary embodiments.

(Modified example)

Figure 5A:
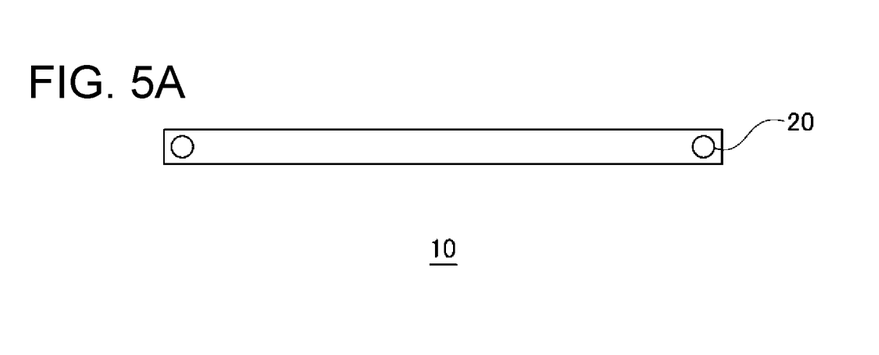
FIG. 5A is a plan view showing a schematic structure of a first restraining member according to a modified example.
Figure 5B:
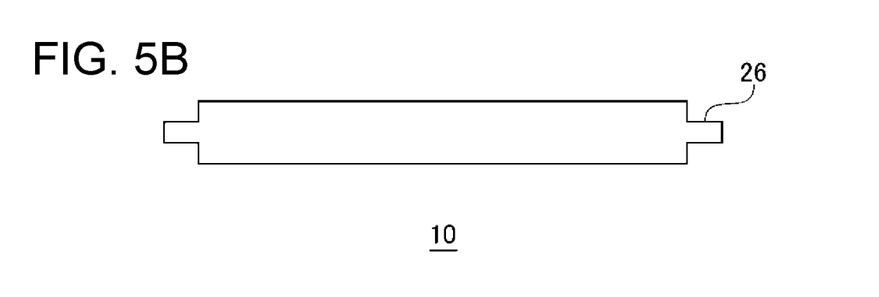
FIG. 5B is a front view showing a schematic structure of the first restraining member according to the modified example.
Figure 5C:
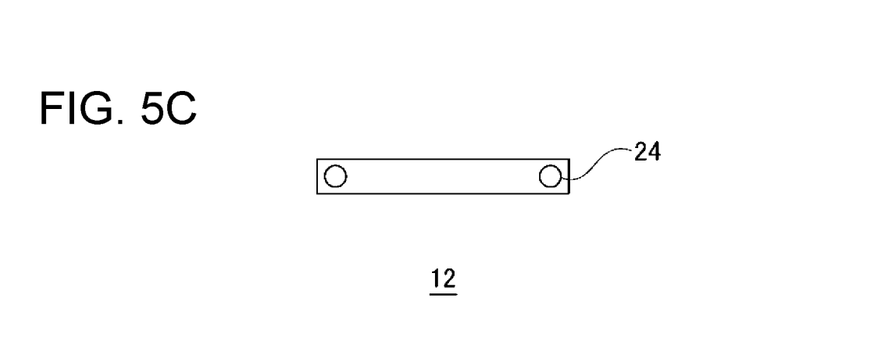
FIG. 5C is a plan view showing a schematic structure of a second restraining member according to the modified example.
Figure 5D:
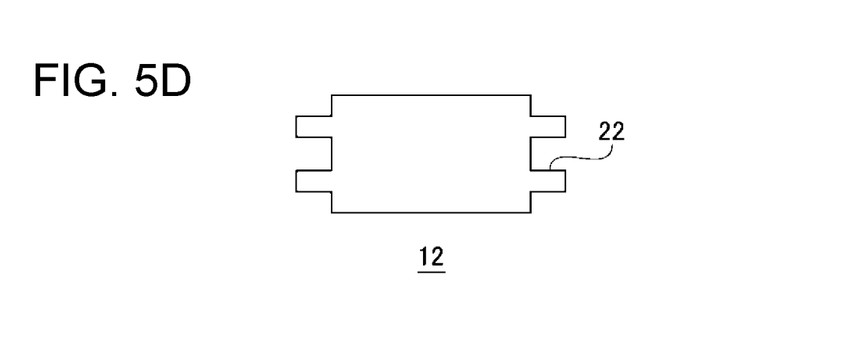
FIG. 5D is a front view showing a schematic structure of the second restraining member according to the modified example.

FIG. 5A is a plan view showing a schematic structure of a first restraining member according to a modified example. FIG. 5B is a front view showing a schematic structure of the first restraining member according to the modified example. FIG. 5C is a plan view showing a schematic structure of a second restraining member according to the modified example. FIG. 5D is a front view showing a schematic structure of the second restraining member according to the modified example.

In the exemplary embodiment, first restraining member 10 has cutouts 22, and second restraining member 12 has narrow-width parts 26. On the other hand, in the modified example, first restraining member 10 has narrow-width parts 26, and second restraining member 12 has cutouts 22. Such a structure as described above can also provide an effect similar to that in the exemplary embodiment. Alternatively, both of first restraining member 10 and second restraining member 12 have cutouts 22, and cutouts 22 of the both members may be fit in each other. Alternatively, both of first restraining member 10 and second restraining member 12 have narrow-width parts 26, and narrow-width parts 26 may be overlapped each other.

In other modified examples, second restraining member 12 and second housing part 24 do not have to be integrally formed. For example, a collar constituting second housing part 24 may be welded on second restraining member 12, so that connecting member 14 may be inserted into the collar. The same thing goes for first restraining member 10 and first housing part 20. Further, first housing part 20 or second housing part 24 is not limited to a through-hole. For example, first housing part 20 and second housing part 24 may each have a groove shape in which a part in a circumferential direction is cut off. Further, the following arrangement is possible: a thread groove is provided in an inner peripheral surface of first housing part 20 and/or second housing part 24; connecting member 14 is constituted by a screw corresponding to the thread groove; and first housing part 20 and/or second housing part 24 is screwed with connecting member 14. Further, lower side hole 20b may be a bottomed recess, so that connecting member 14 may be fixed while a tip end of connecting member 14 is supported by the bottom part of lower side hole 20b. Further, width W1 of region R1 is preferably narrower than width W2 of region R2. However, the present invention is not particularly limited to this structure. Width W1 and width W2 may have the same dimension, or width W2 may be narrower than width W1.

The following are also effective as aspects of the present invention: any combinations of the above-described structural components; and expressions into which the expressions of the present invention are converted between method, device, system, and the like.

The invention claimed is:

1. A battery pack, comprising:
a battery module comprising:
  a battery stack including a plurality of batteries, the batteries being stacked; and
  a plurality of first restraining members and a plurality of second restraining members that restrain the battery stack; and
  connecting members each of which connects one of the plurality of first restraining members and one of the plurality of second restraining members to each other; and
a chassis that houses the battery module, wherein:
each of the plurality of first restraining members extends in a stacking direction of the batteries,
the plurality of first restraining members are arranged in a direction intersecting the stacking direction,
each of the plurality of second restraining members extends in a direction intersecting the stacking direction, and the plurality of second restraining members are arranged in the stacking direction,
neighboring two of the plurality of first restraining members and neighboring two of the plurality of second restraining members define a housing space where the battery stack is housed,
each of the plurality of first restraining members has a first housing part extending in a direction intersecting a planar direction in which the battery stack, the plurality of first restraining members, and the plurality of second restraining members are arranged,
each of the plurality of second restraining members has a second housing part extending in the planar direction,
each of the connecting members connects the one of the plurality of first restraining members and the one of the plurality of second restraining members to each other by being housed in the first housing part of the one of the plurality of first restraining members and in the second housing part of the one of the plurality of second restraining members,
each of the plurality of first restraining members extends from the one of the plurality of second restraining members to the chassis in the stacking direction, and
a gap is formed between the one of the plurality of second restraining members and the chassis in the stacking direction.

2. The battery pack according to claim 1, comprising a plurality of housing spaces that are formed to connect three or more of the plurality of first restraining members to a pair of the plurality of second restraining members.

3. The battery pack according to claim 1, further comprising a spacer that is disposed between one of the plurality of second restraining members and the battery stack to fill a gap between the one of the second restraining members and the battery stack.

4. The battery stack according to claim 1, wherein in each of the plurality of first restraining members, a width of a region adjacent to the battery stack is narrower than a width of a region where the first housing part is provided.

5. The battery pack according to claim 1, wherein each of the plurality of first restraining members has a fixing part that is fixed to the chassis.

* * * * *